UNITED STATES PATENT OFFICE.

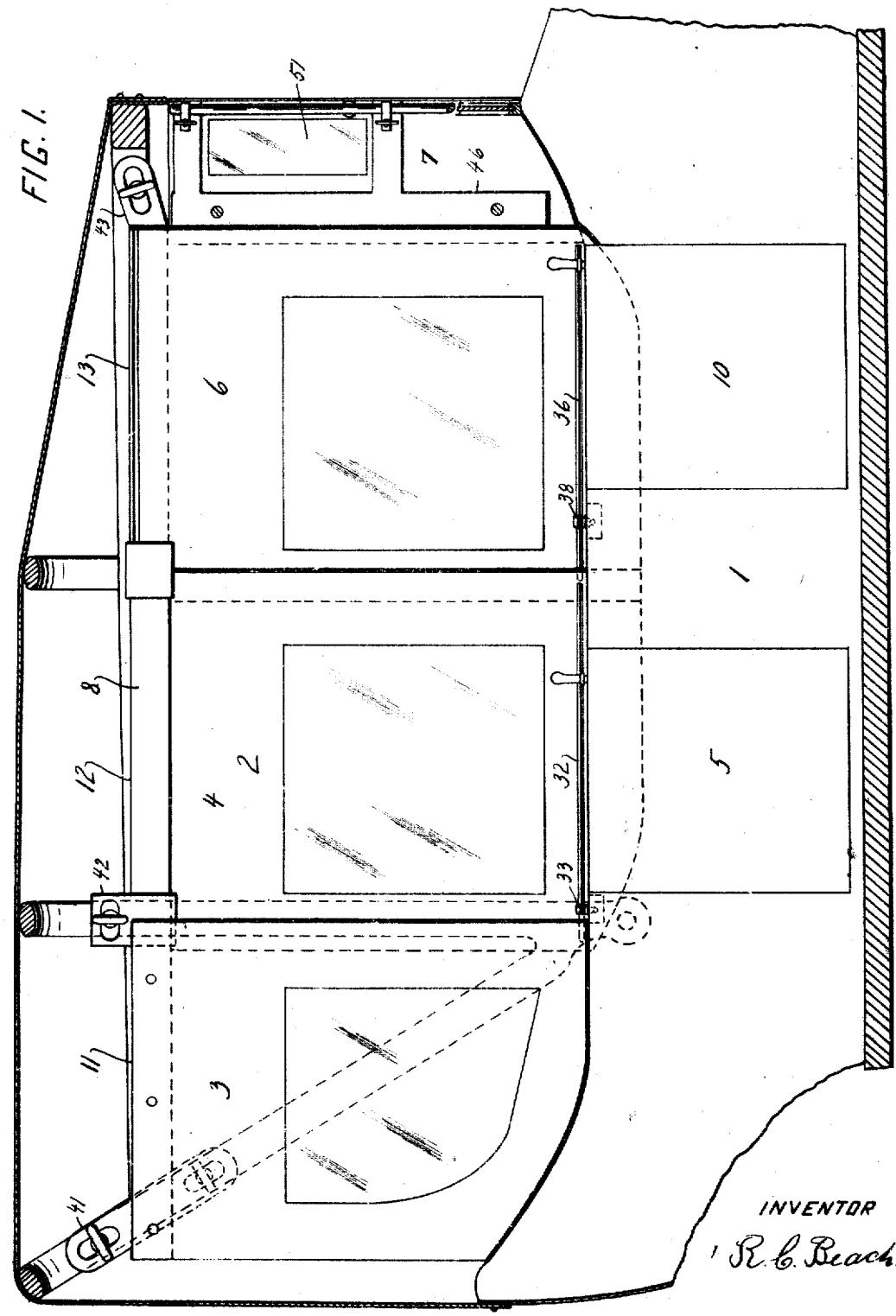

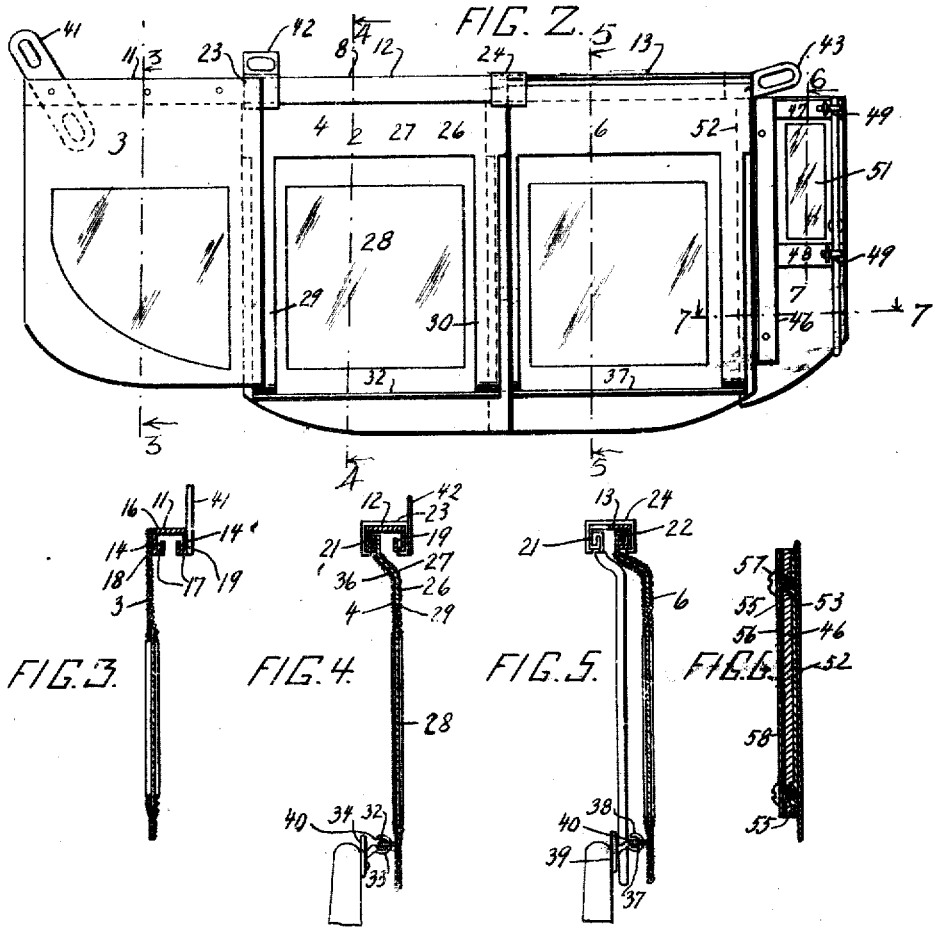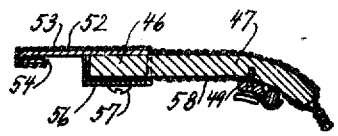

ROBERT C. BEACH, OF SAN FRANCISCO, CALIFORNIA.

DETACHABLE TWO-SLIDE AUTOMOBILE-CURTAIN.

1,366,510.   Specification of Letters Patent.   Patented Jan. 25, 1921.

Application filed June 1, 1920. Serial No. 385,620.

*To all whom it may concern:*

Be it known that I, ROBERT C. BEACH, a citizen of the United States, residing at 455 Eighth avenue, in the city and county of San Francisco, State of California, have invented a new and useful Detachable Two-Slide Automobile-Curtain, of which the following is a specification.

The present invention relates to improvements in sliding curtains in open top automobiles and its object is to provide for open top automobiles a window curtain consisting of four sections of which the rear section is detachably but not slidably attached to a track detachably fastened to the top of the automobile, the front section is detachably fastened to the wind shield and the two center sections slide back and forth in the above mentioned track which can be separated into three parts corresponding in size to the lengths of the three rearward sections of the window curtain.

I attain these objects by the mechanism illustrated in the accompanying drawings, in which Figure 1 represents my window curtain in its place on the automobile, looking at it from the inside of the machine. Fig. 2 represents an inside view of the window curtain detached from the automobile, with the inside curtain fabric removed, Figs. 3, 4, 5 and 6 vertical sections through the window curtain along lines 3—3, 4—4, 5—5, and 6—6 of Fig. 2, and Fig. 7 a horizontal section through the front part of my window curtain along line 7—7 of Fig. 2.

1 is the body of an automobile, looking at it from the inside, with the seats removed, showing the two doors 5 and 10. 2 is my window curtain, consisting of the sections 3, 4, 6 and 7, counting from the rear to the front, and 8 represents the track, consisting of the parts 11, 12 and 13. Part 11 of the track is shown in cross-section in Fig. 3 and is formed by turning the downwardly toeing extended ends of the flanges 14 of the channels 16 inwardly, forming horizontal members 17, and turning the inner ends of these horizontal members upward, forming vertical members the tops of which provide two rails, an inner rail 18 and an outer rail 19, on which the two upward extensions 21 and 22 of the window curtain sections 4 and 6, having the shape of an inverted U, can ride and slide freely. The U shaped extension 21 of curtain section 4 turns inwardly and rides on the inner rail 18, and the U shaped extension 22 of curtain section 6 turns outwardly and rides on outer rail 19.

Part 12 of the track is of the same cross-section as part 11 and, when in place, is in line with the same. Proper alinement is secured by a shoe 23 shaped to fit around the track, its rear end soldered to the front end of part 11, its front end adapted to receive the rear end of part 12.

Part 13 of the track has the cross-section of the outer half of part 11 and its single rail alines with the outer rail 19 of parts 11 and 12, proper alinement being secured by shoe 24 of the same shape as shoe 23 and soldered to the rear end of part 13 of the track.

Section 3 of the window curtain is buttoned to the outside of part 11 of the track on the inside of the automobile. Curtain section 4 is stiffened by a metal frame 26, consisting of a metal plate 27, taking up the larger part of the curtain above the window 28 and having two downwardly extending arms 29 and 30, one on either side of the window 28 and reaching well below the window. At their lower ends these arms 29 and 30 are curved inwardly, that is toward the automobile, and are soldered to the ends of a rod 32 adapted to slide in an eyehole 33 at the end of a bracket 34 provided on the outside of the automobile, near the top of the body and a small distance behind the second door 5. Toward the top the metal plate 27 curves inwardly, as shown at 36, then continues in a vertical direction and runs out into the inverted U previously referred to. On either side the metal plate 27 is covered by curtain fabric which overlaps the metal sufficiently everywhere to give the curtain the desired shape and to furnish a frame for the window 28 between the two arms 29 and 30 of the metal plate.

Section 6 of the window curtain is constructed substantially in the same manner as section 4, the difference being that its U shaped upper extension 22 turns the opposite way from extension 21 of section 4 and that its rod 37 slides in an eyehole 38 at the end of bracket 39 provided on the outside of the automobile, near the top of the body and a small distance behind the front door 10. The eyeholes 33 and 38 are provided on the side next to the body of the automobile, with an opening 40, through which rods 32 and 37 of curtain sections 4 and 6 can pass, the object being to enable the driver to spring the rod 33 into the eyeholes when the same are at or near the center of the curtain sections, but to prevent the rods from leaving the eyeholes on a mere backward and forward motion of the curtain sections 4 and 6.

The track is fastened to the automobile by means of metal clips 41, 42 and 43, provided with eyes to fit over buttons fastened to the frame of the top of the automobile in suitable places. Clip 41 is soldered to the outside of part 11 of the track at its rear end and extends upward as well as downward, in order to prevent any vibrating of the track; clip 42 is soldered to shoe 23 and clip 43 to the front end of track 13.

The device works as follows: To attach it, button clips 41 and 42 on part 11 of the track to their respective places, slide the rear end of part 12 of the track into shoe 23, slide shoe 24 of part 13 of the track over the front end of part 12 and button clip 43 to its place. Button curtain section 3 to part 11 of the track; bring the rear end of the U shaped extension 21 of curtain section 4 in operative contact with the front end of rail 18 and slide the curtain section backward; when its center approaches bracket 34, spring rod 32 into the eyehole 33. Curtain section 4 is now attached and may be slid backward and forward at the pleasure of the driver, being prevented from going too far either way by the curved lower extremities of the arms 29 and 30 of the metal frame running against the eyehole 33; next lift curtain section 6 on the rail 19 of part 13 of the track and slide it backward, springing its rod 37 into the eyehole 38, when it will be in a position where the driver may slide it forward and backward at his pleasure, it being limited in its motions in the same manner as curtain section 4. If the driver wishes to run the automobile closed, these limited motions will enable him to clear the entrance immediately when using the door. If he wishes to drive the automobile open, he may push the two curtain sections clear back to the rear end, after having lifted rod 37 out of eyehole 38, and if he wishes to close it again, it will take only an instant to slide them forward and to spring rod 37 into eyehole 38. If he does not anticipate using the curtains at all, he can remove curtains and track in a very short time and stow them away in a very small place in the automobile.

The front section 7 of the curtain is constructed as follows: Its frame consists of a rather heavy vertical metal plate 46 near its rear end, having two forwardly extending horizontal arms 47 and 48, with sufficient space between them to allow room for window 51. The forward ends of these arms 47 and 48 are curved inwardly and slightly overlap the wind shield. A clamp 49 is provided for each arm 47 and 48, by means of which these two arms can be securely fastened to the posts holding the wind shield or to the frame of the wind shield, if there are no posts. The heavy plate 46 is laid flat against the front end of a thinner and wider plate 52, two bosses 55 of plate 52 fitting into corresponding recesses in plate 46. The outside curtain fabric 53 is carried around the arms of plate 46 and around plate 52, as shown in Fig. 7, bent over the rear edge of plate 52 and clamped into a space between plate 52 and its bent over edge 54, while the inside curtain fabric 58 is laid against the inner surface of plate 46 and its arms and firmly pressed against plate 46 by a channel shaped shoe 56 held in place by two screws 57 extending through holes in the plate 46 and screwed into threaded recesses in the bosses 55 of plate 52. The rear edge of plate 46 forms a shoulder against which bears the front edge of curtain section 6.

I claim:

In an open top automobile a side curtain in combination with a longitudinal track detachably fastened to members of the frame of the automobile top in suitable places, the track to have two inwardly and upwardly extending rails, one inner rail and one outer rail, and to consist of a rear part, a middle part and a front part, the three parts detachably joined and alined at their juncture by shoes fitting around the joints, the outer rail to extend through the three parts and the inner rail to extend through the rear and middle parts, the curtain to consist of a rear section, a rear middle section, a front middle section and a front section, the rear section detachably fastened to the inside outer surface of the rear part of the track, the front section detachably fastened to a wind shield member, each of the middle sections to have a metal frame between two sheets of curtain fabric, the metal frame to consist of a metal plate extending through the top of the curtain section and two downwardly extending arms, the lower extremities of said arms to be curved, to extend through the inside fabric and to be rigidly joined to a horizontal rod extending from one arm to the other, an upward extension of the metal plate of the rear middle section adapted to slide on the inner rail, an upward extension of the metal plate of the front middle section adapted to slide on the outer rail, each of the horizontal rods to slide in an eyehole attached to the outside of the body of the automobile and adapted to be sprung into and out of said eyehole by the operator, but to remain in said eyehole on a mere backward or forward motion of the curtain.

ROBERT C. BEACH.